Sept. 18, 1923.  R. M. COMFORT  1,468,592
COUPON TICKET
Filed May 3, 1919
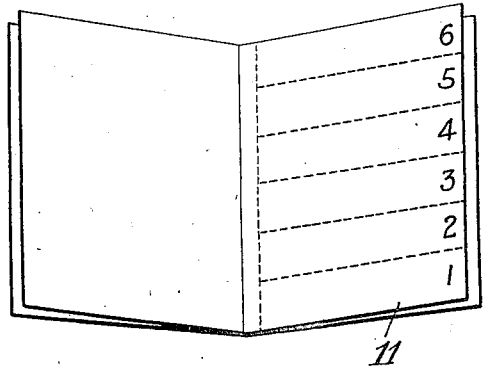

Patented Sept. 18, 1923.

1,468,592

UNITED STATES PATENT OFFICE.

RALPH M. COMFORT, OF NEW YORK, N. Y., ASSIGNOR TO ETHEL N. COMFORT, OF NEW YORK, N. Y.

COUPON TICKET.

Application filed May 3, 1919. Serial No. 294,611.

*To all whom it may concern:*

Be it known that I, RALPH M. COMFORT, a citizen of the United States of America, residing at New York city, county and State of New York, have invented certain new and useful Improvements in Coupon Tickets, of which the following is a specification.

My invention relates to systems of awarding prizes in connection with special programs carried out in theatres, or other places of amusement or public assembly, such as moving picture theatres, and comprises a special form of admission or seat ticket which also serves as a means for competing for the prizes.

In the particular type of prize competition above referred to, the qualifying condition is that the contestant shall submit a correct record of the order in which certain characteristic designs, such as trademarks or business emblems, have been displayed on the screen by a moving picture or similar apparatus during a number of performances, days or weeks.

This ordinarily requires the attendance of the contestant at the theatre on a number of occasions and the purpose of my present invention is to provide means which may enable the contestant to obtain one or more free admissions to the theatre and which will also serve as a direct means of participation in the contest. To this end it comprises a special form of coupon ticket with a number of detachable coupons each good for one admission, and another coupon which serves as evidence of purchase of the ticket proper, and which when presented to the prize contest management requires the crediting of a certain number of points in the competition to the contestant whose name and address is written thereon. The ticket may also contain additional coupons on which free admission may be had to stimulate participation in subsequent contests, or on which further special tickets can be bought. The first mentioned set of coupons preferably equal in number the performances given at the theatre in a week, or of a given program, and the ticket as a whole is sold at a price which gives a slight reduction below box office price on each admission coupon. In this way the sale of admission tickets to the theatre is stimulated and the contestant is enabled by re-selling the admission coupons at box office prices to later get free admission himself or even to so participate in the prize contest without expense, besides earning additional points in the competition.

The best form of embodiment of my invention at present known to me is illustrated in the accompanying sheet of drawings in which, Fig. 1 is a face view of the ticket;
Fig. 2 is a back view, and
Fig. 3 is a perspective view of the voucher sheet of the contest book on presentation of which vouchers the tickets are issued.

Throughout the drawings like reference characters indicate like parts. 11, is the page of ticket issuance vouchers which may form a part of a contest book prepared for prize distributing purposes. These voucher coupons evidence the right to purchase special tickets sold only upon presentation thereof. Usually the number of coupons would conform to the number of weeks or other divisions of the contest, one program being repeated during the period of each division, though it may be determined by other considerations. As shown there are six vouchers showing that the contest book is made up for a six weeks contest period.

Each ticket in its preferred form comprises a stub 7, to one end of which are attached the series of admission coupons 1, 2, 3, 4, 5, 6, each one of which is good for one admission to the theatre. Preferably these coupons are marked "Not good if detached", or with some other legend requiring them to be presented to the ticket taker with the ticket stub 7. The idea is that the original contestant, buying this ticket as a whole, will either pass the same around among the members of his family, who will use it to also become contestants in the prize competition, or sell it to some friend whom he may interest in the competition. There is, of course, no objection to one person buying successively a number of these tickets and selling them for whatever profit he can get out of such sales. It is not desired, however, that the tickets shall be purchased by ticket speculators and the coupons detached and sold separately, and for this reason it is preferable to mark each one of these six coupons with some such legend as above stated. Any other number of such coupons could be substituted. On the back of the stub 7, may be any printed matter such as a form of personal identification card to be filled out and kept by the purchaser. On the back of the coupons 1 to 6, or on other parts of any of the coupons advertising matter of the contests themselves or other matter may be printed as indicated at 12 in Fig. 2.

Preferably the printed matter on the face of stub 7, would read substantially as follows:

IDEOGRAPHS CONTEST, NUMBER —.
Ticket stub.

In consideration of the contest voucher delivered and of the special price paid (5 times the highest regular price of the best orchestra seats, for the below mentioned performances),—each of the 6 coupons attached hereto entitles the bearer to an admission if presented before 5 o'clock p. m. on any week day except Saturdays (or holidays) not later than August 31, 1919, at the theatre named herein—but is good only if officially stamped (or countersigned) by the management hereon.
----------------------, Manager.

At the other end of the stub is a coupon 8, which when detached may be submitted to the contest management and serve as a claim for the crediting, and evidence for the award, of the number of honor points allowed for the sale of the admission coupons. Preferably the printed matter on the face of this coupon 8, shown in Fig. 1, would read substantially as follows:

IDEOGRAPHS CONTEST, NUMBER —.
Certificate—Sale of theatre ticket.

This certificate, when completely filled in and delivered per contest rules, evidences the fact that the contestant whose signature appears on the reverse side hereof is entitled to the number of contest honor points stated in the contest book (from which the ticket voucher coupon was taken for purchasing the ticket next mentioned) because of the sale of the ticket which was then attached hereto, to:
(Purchaser's name) ----------------------
(Address) ----------------------
the said ticket being for use at the theatre whose name is officially stamped hereon and whose name and address is written on the reverse side hereof.

while the back of this coupon 8, shown in Fig. 2, would read substantially as follows:

IDEOGRAPHS CONTEST, NUMBER —.

I hereby state that I am a qualified contestant in the Ideographs Contest, Number — at the:
(Theatre name) ----------------------
(Address)—
  Street ----------------------
  Town ----------------------
and have been instrumental in the purchase of 6 admissions thereto, in accordance with the conditions printed on the ticket stub which was then attached hereto, for the person whose name and address is written on the reverse side hereof and to whom the ticket has been delivered.
(Contestant's name) ----------------------
(Address)—
  Street ----------------------
  Town ----------------------

The face of coupon 9 (shown in Fig. 1) would read substantially as follows:

IDEOGRAPHS CONTEST, NUMBER —.
Extra ticket voucher coupon.

This voucher coupon entitles the contestant who has signed his (or her) name on the reverse side hereof to purchase at the theatre whose name is officially stamped (or countersigned) by the management of same hereon (------ ------, manager) one of the special coupon tickets on sale in connection with the Ideographs Contest, Number — on the terms stated in the contest book (same as on the ticket stub) upon surrender of this coupon to the theatre, with the name and address of the purchaser written on the reverse side hereof.

(This coupon is good only while the limited quota of said tickets lasts, and only during the showing of said contest at this theatre).

while the back (shown in Fig. 2) would read substantially as follows:

IDEOGRAPHS CONTEST, NUMBER —.

I hereby state that I am a qualified contestant in the Ideographs Contest Number — at the theatre whose name appears on the reverse side hereof, and that I wish to negotiate the sale of one of the special coupon tickets thereon mentioned for:
(Purchaser's name) ----------------------
(Address) ----------------------
And I wish delivered to me, attached thereto, the contest certificate to which I am thus entitled.
(Contestant's name) ----------------------
(Address) ----------------------

The coupon 10, when validated by the management of the contest serves as evidence that the holder has actually qualified in the contest for which the ticket as a whole was issued, and entitles the holder to certain courtesies of the theatre as a reward for his success in qualifying, whether or not he won a prize. The face of this coupon 10, would preferably read substantially as follows:

IDEOGRAPHS CONTEST—NUMBER —.
Proof coupon.

I hereby submit this proof coupon to the Ideographs Company of New York as evidence that I have successfully negotiated the sale of one special coupon ticket in connection with the Ideographs Contest Number— for the theatre whose name appears on the reverse side hereof, and I hereby request the said company to officially stamp this coupon and return it to me so that I may use it in the manner indicated on the reverse side hereof.
(Contestant's name)_____
(Address)_____

The back of coupon 10 would read substantially as follows:

IDEOGRAPHS CONTEST—NUMBER —.

This proof coupon, when officially stamped by the Ideographs Company of New York, entitles the contestant, whose name appears on the reverse side hereof and who qualified in the Ideographs Contest Number —, or another person accompanying him (or her) to
One free admission
to any performance before August 31, 1919, in any part of the theatre whose name is officially stamped or countersigned (_____ _____ manager) hereon.

This free admission is the reward for the contestant's successful efforts as claimed on the reverse side hereof.

In use the contest book would be issued to each applicant in the audience during a certain period at the theatre where the contest was to be staged. On presenting one of the voucher coupons 11, a complete ticket would be issued to the applicant at a reduced price, say for the price of five admissions, if there are six admission coupons 1 to 6. By selling five of these at box office price the contestant might gain free admission to the contest for himself, so that he may qualify. By filling out coupon 8, and submitting it to the contest management he would secure credit for the honor points due him for effecting the purchase of the admission coupons. On presenting the coupon 9, to the theatre box office he would be permitted to buy another of the complete special tickets upon this evidence of that privilege. If the ticket holder qualifies in the contest, or thinks he has qualified he sends coupon 10, to the contest management and on return of it after validation by the management, he can obtain another free admission to the theatre.

Having described my invention, I claim:

1. A theatre ticket having in combination a stub bearing printed matter containing general instructions as to the mode of use, a plurality of coupons attached to one end each bearing suitable printed matter setting forth that it is good for an admission to the theatre, and another coupon associated with the stub bearing suitable printed matter adapting it to serve as a proof of purchase of the stub and first mentioned coupons.

2. A special coupon ticket such as set forth in claim 1, combined with another coupon bearing marks adapted to serve as voucher, on presentation of which another like ticket may be purchased.

3. A special coupon ticket such as set forth in claim 1 combined with another coupon bearing suitable marks adapting it when detached and authenticated by the issuing source to also serve as an admission ticket.

4. A theatre ticket having in combination a series of attached coupons each bearing suitable printed matter setting forth that it is good for one admission to the theatre, and a stub bearing marks adapting it to serve as evidence of the sale of the said coupons in a prize contest in which such sales form an element.

5. A special coupon ticket such as set forth in claim 1 combined with a coupon bearing suitable marks adapting it to serve as a voucher, on presentation of which another like ticket may be purchased and a coupon so marked that when authenticated by the issuing source it serves also as an admission ticket.

6. A theatre ticket, having in combination a stub bearing printed matter containing general instructions as to conditions of sale, a plurality of coupons attached to one end of the stub, each coupon bearing suitable printed matter setting forth that it is receivable on account of an admission to the theatre, and another coupon associated with the stub, which coupon bears suitable printed matter adapting it to serve as proof of the purchase of the stub and first mentioned coupon.

RALPH M. COMFORT.